United States Patent
Wölfler et al.

(10) Patent No.: US 12,012,734 B2
(45) Date of Patent: Jun. 18, 2024

(54) SINK WITH AN INSERT PLATE WHICH CAN BE MOVED AUTOMATICALLY ON THE BASIS OF AN INFLUENCING FACTOR, AND METHOD

(71) Applicant: BSH Hausgeräte GmbH, Munich (DE)

(72) Inventors: Andreas Wölfler, Saalfelden (AT); Benjamin Reu, Prien am Chiemsee (DE)

(73) Assignee: BSH Home Appliances Corporation, Munich (DE)

( * ) Notice: Subject to any disclaimer, the term of this patent is extended or adjusted under 35 U.S.C. 154(b) by 144 days.

(21) Appl. No.: 17/776,665

(22) PCT Filed: Nov. 11, 2020

(86) PCT No.: PCT/EP2020/081725
§ 371 (c)(1),
(2) Date: May 13, 2022

(87) PCT Pub. No.: WO2021/104867
PCT Pub. Date: Jun. 3, 2021

(65) Prior Publication Data
US 2022/0396939 A1 Dec. 15, 2022

(30) Foreign Application Priority Data
Nov. 29, 2019 (DE) .................. 10 2019 218 646.7

(51) Int. Cl.
*E03C 1/186* (2019.01)
*E03C 1/05* (2006.01)
*H04N 7/18* (2006.01)

(52) U.S. Cl.
CPC .............. *E03C 1/186* (2013.01); *E03C 1/057* (2013.01); *H04N 7/18* (2013.01)

(58) Field of Classification Search
CPC ......... E03C 1/181; E03C 1/186; A47B 77/06; A47L 19/02; A47L 17/02; A47J 47/20
See application file for complete search history.

(56) References Cited

U.S. PATENT DOCUMENTS 3,346,886 A * 10/1967 Kashiwamura ......... E03C 1/186
108/134
3,882,553 A 5/1975 Poiencot
(Continued)

FOREIGN PATENT DOCUMENTS

CN 106579805 A * 4/2017
CN 106579805 A 4/2017
(Continued)

OTHER PUBLICATIONS

National Search Report DE 10 2019 218 646.7 dated Aug. 21, 2020.
International Search Report PCT/EP2020/081725 dated Jan. 21, 2021.

*Primary Examiner* — Erin Deery
(74) *Attorney, Agent, or Firm* — Michael E. Tschupp; Andre Pallapies; Brandon G. Braun

(57) ABSTRACT

A sink includes a basin including a base wall and lateral walls adjoining the base wall, with the basin including a receiving area delimited by the base wall and the lateral walls. An insert plate separate from the basin is inserted into the receiving area and moveable by a lifting device relative to the basin. An interaction unit is provided to detect an influencing factor involving an operating state of the sink, and/or a change in the operating state of the sink, and/or an operating action by a user of the sink, with the lifting device automatically changing a position of the insert plate in response to a detection of the influencing factor by the interaction unit.

16 Claims, 1 Drawing Sheet

(56) References Cited

U.S. PATENT DOCUMENTS

2005/0067747 A1   3/2005  Erickson
2015/0000026 A1*  1/2015  clements .................. E03D 9/08
                                                    4/443

FOREIGN PATENT DOCUMENTS

| CN | 109235561 A | 1/2019 |
| CN | 109695275 A | 4/2019 |
| CN | 110158716 A | 8/2019 |
| CN | 111021495 A | 4/2020 |
| DE | 3621151 A1  | 1/1988 |

* cited by examiner

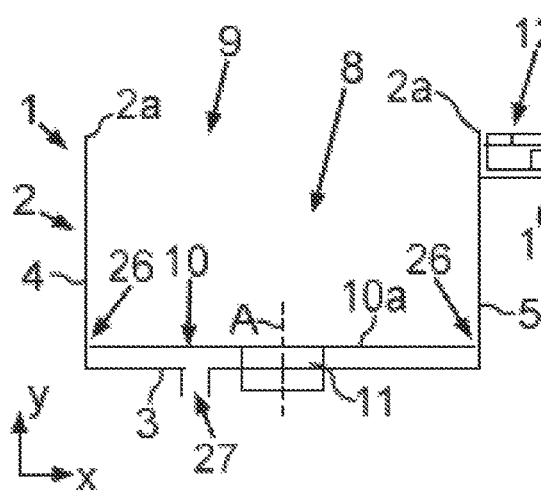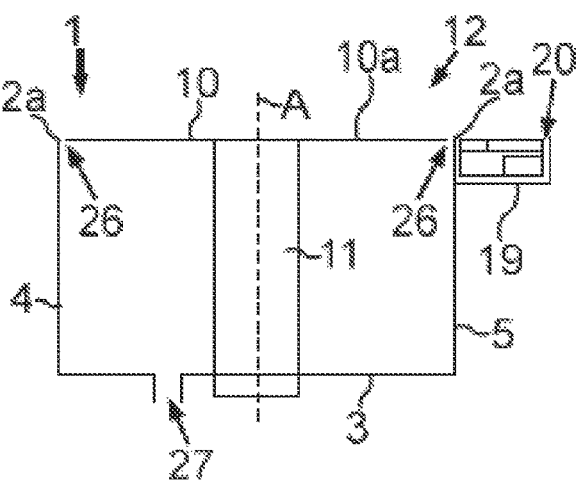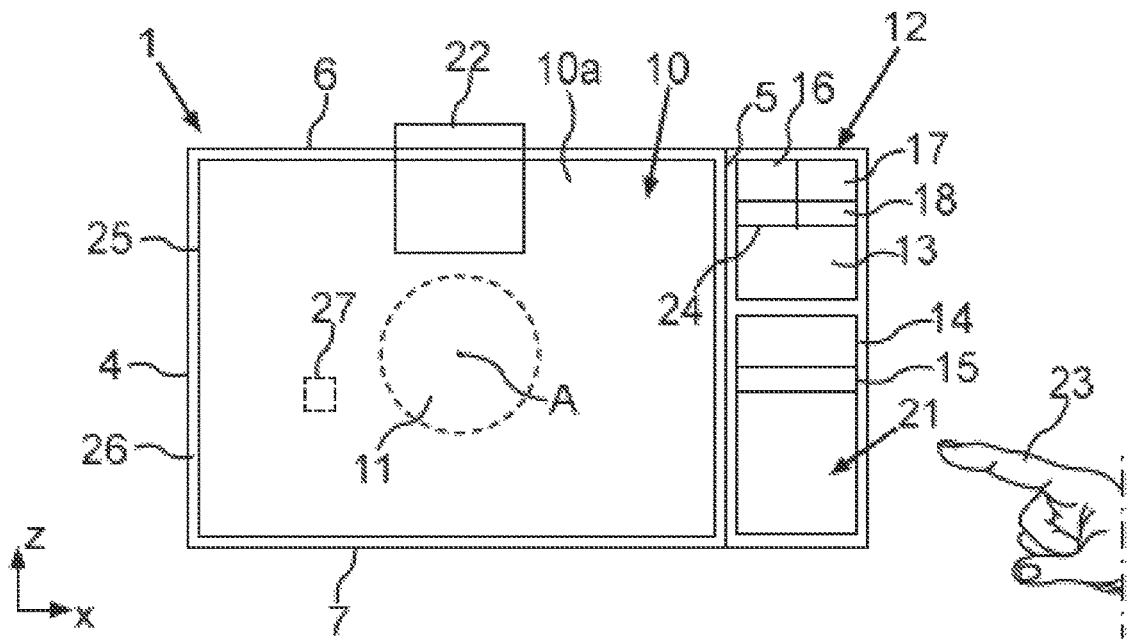

SINK WITH AN INSERT PLATE WHICH CAN BE MOVED AUTOMATICALLY ON THE BASIS OF AN INFLUENCING FACTOR, AND METHOD

CROSS-REFERENCES TO RELATED APPLICATIONS

This application is the U.S. National Stage of International Application No. PCT/EP2020/081725, filed Nov. 11, 2020, which designated the United States and has been published as International Publication No. WO 2021/104867 A1 and which claims the priority of German Patent Application, Serial No. 10 2019 218 646.7, filed Nov. 29, 2019, pursuant to 35 U.S.C. 119(a)-(d).

The contents of International Application No. PCT/EP2020/081725 and German Patent Application, Serial No. 10 2019 218 646.7 are incorporated herein by reference in their entireties as if fully set forth herein.

BACKGROUND OF THE INVENTION

One aspect of the invention relates to a sink with a basin. The basin has a base wall and lateral walls adjoining the base wall. The basin has a receiving area delimited by the walls. Moreover, the sink has an insert plate which is separate from the basin and which is inserted into the receiving area. A further aspect of the invention relates to a method for operating a sink.

Such sinks are known. Thus a sink which has a basin is disclosed, for example, from US 2005/0067747 A1. A base which is configured in one piece with the basin bottom and which extends upwardly is configured on the basin bottom. A plate may be attached to this base. As a result, a cutting board is formed on which objects, such as food, may be chopped. Such an embodiment is disadvantageous in that the integrated base is always present and thus a basic embodiment of the basin is complex in terms of shape and is configured such that the receiving area is restricted over the periphery. Moreover, it is always the case that the plate which is able to be positioned on the base is arranged only at one height level. The plate is only able to be positioned or removed by a user.

A sink is also disclosed in DE 362 1151 A1. Various inserts which may be inserted into the receiving area are provided separately from the basin. The inserts may be plates or further basin-like containers. These inserts may be positioned on the upper edge of the basin. The usability of a sink is also significantly restricted thereby and the inserts have to be attached or removed by a user, and it is always the case that the inserts are able to be positioned only at one individual position.

BRIEF SUMMARY OF THE INVENTION

It is the object of the present invention to provide a sink with a basin and a separate insert plate, as well as a method in which the positioning of the insert plate is improved.

This object is achieved by a sink and a method as claimed in the independent claims.

One aspect of the invention relates to a sink with a basin. The basin has a base wall and lateral walls adjoining the base wall. The basin also has a receiving area delimited by the base wall and the lateral walls. The receiving area is open at the top. The sink has an insert unit, in particular an insert plate, in particular a contiguous and non-perforated insert plate, which is separate from the basin. This insert plate is able to be inserted into the receiving area or is inserted therein. The sink also has a lifting device, by means of which the insert plate can be moved relative to the basin in the height direction of the sink. The sink also has an interaction unit. By means of the interaction unit an operating state of the sink can be detected and/or a change in the operating state of the sink can be detected and/or an operating action by a user of the sink, who is operating the sink, can be detected. The lifting device can be operated so as to automatically position, in particular change the position, of the insert unit on the basis of the detection by means of the interaction unit. By means of such an embodiment, a sink is provided in which in principle the insert unit may be positioned at different vertical positions relative to the base wall of the basin. This is made possible by a physical lifting device of the sink. Thus a sink is provided in which in principle the possibility is provided to arrange the insert unit at different vertical positions. This is also made possible by a lifting device and does not have to be carried out manually by the user himself. Moreover, the sink is also configured with an interaction unit so that this change in the position may not only be carried out automatically but as a function of quite specific influencing criteria. If these influencing criteria are detected, this positioning is carried out automatically by the lifting device. Thus a sink is provided which also acts in an intelligent manner regarding the positioning of the insert unit. Thus it is also possible that the user himself does not specifically have to bring about the change in the vertical position of the insert unit, but an event which is predefined therefor automatically leads to this positioning being carried out. This influencing criterion is thus an initial process which effects this positioning.

Such influencing criteria are thus indirect indicators which enable the sink to detect that a positioning of the insert unit is advantageous and/or is desired. In this context, corresponding links between influencing factors and assigned positions of the insert plate or changes in the position of the insert plate may be predefined by a user. However, it may also be provided that the interaction unit has learnt which influencing criteria the user has previously used to set the position and/or the change in the position of the insert plate, for example on the basis of evaluating the previous behavior of the user. By means of such an embodiment, the sink may also be configured as a self-learning system regarding the linking of an influencing factor and the advantageous or desired position and/or change in the position of the insert plate.

In an advantageous embodiment it is provided that the interaction unit has a camera and/or an operating device. This is a further advantageous embodiment. This is because very different influencing criteria, and at the same time a plurality thereof, may be recorded by a camera. In this context, for example, a functional unit of the sink may be optically recorded. Additionally or alternatively, however, a user may also be optically recorded. An influencing criterion thus may be detected as a function of this recorded information. In turn, the positioning of the insert plate may be carried out as a function thereof. An influencing criterion, as mentioned above, may be the operating state of the sink and/or a change in the operating state of the sink and/or an operating action by a user of the sink who is operating the sink. In this context, an operating state may be a current operating state or a previous operating state. A change in the operating state may be a current change in the operating state or a change in the operating state which has already passed. An operating state, however, may also be an operating state to be anticipated in the future. A change in the operating state, however, may also be a change in the operating state to be anticipated in the future. Such future states may be estimated or predicted by the interaction unit. This may be carried out, for example, on the basis of previous operating states and/or current operating states and/or previous changes to the operating state and/or previous changes to the operating state. This may also be implemented by using current and/or previous operating actions by a user of the sink. Thus current and/or previous operating actions of the sink by a user may be considered in this regard.

A further advantage of a camera is also that such influencing criteria may be recorded in a contactless manner.

Corresponding operating states and/or changes to the operating state and/or specific operating actions may be detected and evaluated by an operating device. In principle, an operating device may have operating elements such as buttons, switches or the like. These operating elements may be manually actuated. However, an operating device may also have, for example, a touch-sensitive operating panel. However, the operating device may also have a display unit.

In an advantageous embodiment it is provided that an operating state is a setting of the operating device and/or a change in the operating state is a change in the setting of the operating device.

In an advantageous embodiment it is provided that a change in the position of the insert plate is on the basis of the type and/or the intensity and/or the duration of an operating state of at least one functional unit of the sink. Thus not only is a basic operating state defined as the influencing criterion but in this advantageous embodiment the operating state is also analyzed in more detail. This may also be correspondingly recorded and detected by the interaction unit. Since an operating state is not only detected in a generalized manner but this operating state is also analyzed in more detail, it is possible to carry out an even more appropriate setting of the position and/or a change in the position of an insert plate. In this context, therefore, it is not only possible for a generalized position or change in the position of the insert plate to be implemented but also the type of change in position and/or the duration of the change in position may be implemented in more detail. For example, the position of the insert plate may be individually set, for example by the type of position. This means that, for example, only a horizontal position of the insert unit is changed. However, it is also possible to carry out a change from a horizontal position into a tilted position. For example, it is also possible to carry out a change from a horizontal position into a rotational movement of the insert plate. The same may also be respectively carried out in reverse. Moreover, it may also be provided that the inclination may be increased or reduced, for example starting from a tilted position of the insert plate. For example, the speed of the rotation may also be increased or reduced. For example, the type of change in position may also include the speed at which an initial position is changed into an end position. A change in the position may also involve a pattern of a plurality of different positions of the insert plate which successively follow one another. Thus the type of change in position may also include an individual movement pattern of the insert plate. For example, starting from a first position of the insert plate it is possible to change into a second position and from this second position, for example, in turn change into the first position. However, when this second position is reached, it is also possible to change into at least one third position. These are only some examples of movement patterns which are also to be incorporated in the feature of the type of change in position. Thus a type of change in position is understood to mean very varied and many different types of movement patterns of the insert plate. By such movement patterns it is possible to react automatically in the best possible manner to specific influencing factors in order to be able to provide the respective designated use of the insert plate in the best possible manner and/or to avoid negative positions of the insert plate in the case of potentially dynamically changing influencing factors. Thus, in the case of dynamic influencing factors, it is also possible that a dynamic change in the position which is associated therewith may also be carried out.

Thus it is also possible that a plurality of, in particular at least two, types of operating state may be present or may be available. These types of operating state may be detected by the interaction unit. Thus these types of operating state may also be different. The same may be provided for the intensity and/or the duration. The same may also be provided for the type and/or intensity and/or duration of a change in the operating state.

In particular a time and/or a speed and/or a type of positioning, in particular a change in the position, of the insert unit, in particular the insert plate, may be determined. In particular, this is carried out as a function of the type and/or the duration and/or the intensity of the operating state and/or corresponding to the change in the operating state.

Additionally or alternatively, in an advantageous embodiment it may be provided that a change in the position of the insert plate is on the basis of the type and/or intensity and/or duration of a change in the operating state of at least one functional unit of the sink. The aforementioned exemplary embodiments of a type and/or intensity and/or duration of an operating state are also correspondingly to be understood relative to the further embodiment of a type and/or duration and/or intensity of a change in the operating state. The corresponding advantages are thus achieved in a similar manner here.

In an advantageous embodiment it is provided that the sink has, for example, a faucet as a functional unit. A further functional unit may be, for example, an operating device. A further functional unit may be the insert plate itself. A further functional unit may be, for example, the lifting device. By such detailing, not only is the overall state of the sink able to be considered but separate individual functional units may be considered here. A plurality of such aforementioned functional units of the sink may also be observed at least temporarily at the same time and may be analyzed regarding their operating states and/or changes in the operating state. By means of such an embodiment, a position of the insert plate and/or a change in the position of the insert plate which is even more appropriate may be achieved. Thus a position setting or a change in the position of the insert plate potentially has to be undertaken differently in a specific operating state or in the case of a specific change in the operating state of the faucet from the manner in which it is undertaken in a specific operating state or in the case of a specific change in the operating state of the operating device.

In an advantageous embodiment it is provided that the change in the position is a linear lifting movement. In particular, this linear lifting movement is in the height direction of the sink. Thus it is achieved that the insert plate is moved vertically upwardly or downwardly.

In principle, it is possible that a continuous vertical adjustment of the insert plate is made possible by the lifting device. Thus it is possible to approach and set many different height levels of the insert plate.

In a further advantageous embodiment it is provided that the change in the position is a tilting movement of the insert plate about a horizontally oriented axis. Thus the plate may be arranged in an inclined or oblique manner. This may have advantages, for example, if liquid is present on the top of the insert plate and is designed to drain in a targeted manner into the basin. The ability to clean using water running out of the faucet is thus also made possible in an improved manner, since media on the top of the insert plate may also be washed off more easily. Thus the water stream from the faucet, in particular, no longer strikes the top perpendicularly but at a reduced acute angle thereto. The spray behavior of the water stream which strikes the top of the insert plate is thus reduced or occurs extensively in the basin. An excessive lateral spraying over the basin, which is undesired, is avoided thereby.

In a further advantageous embodiment it is provided that the change in the position of the insert plate is a rotational movement. This means that the insert plate may rotate about a vertical axis. In an advantageous embodiment the rotational speed may be changed. By means of such an embodiment the insert plate may also be individually positioned, which means that a rear region of the insert plate optionally may be pivoted to the front or may be pivoted to the side. If the rotational speed is not only a very slow rotation about the vertical axis but takes place more rapidly, a type of centrifugal spin plate may also be formed. Optionally media which are arranged on the top of the insert plate may also be thrown to the side thereby.

In a further advantageous embodiment it is provided that an operating action is a contactless gesture of the user of the sink. As a result, the operation of the sink may also be gesture-controlled. This is a further advantage since if the fingers of the user are potentially contaminated, the operating device no longer has to be directly touched and thus is not also contaminated. It is also possible that an operating action is a speech command, in particular of a user. However, the speech command may also be generated, for example, by a different electronic unit, such as for example a different household appliance. Such a speech command may also be generated, for example, by a communication terminal such as a mobile radio terminal or a difference acoustic source. This may be advantageous if a user is potentially mute or speech-impaired.

In an advantageous embodiment an operating action may be a process of touching an operating surface of the operating device. For example, a user may directly act manually with one finger. An operating action may be an operating process of the other functional unit of the sink. For example, this may be an operating process of a faucet of the sink. However, an operating action may also be, for example, a specific approach of a user to the sink. For example, this may be recorded by a proximity sensor or by the camera. It may also be detected thereby that an immediate use of the sink by a user is imminent. An advantageous position of the insert plate may then already be set in an appropriate manner, in particular previously or at the same time as the use thereof.

In an advantageous embodiment it may be provided that the interaction unit has a defining mode. In this defining mode, which is different from the normal mode of the interaction unit, at least one user may predetermine in a defined manner at least one reference position of the insert plate. In particular, at least one reference position of the insert plate may be linked with a specific operating state and/or a specific or defined change in the operating state. Thus the user may undertake an individual configuration of the sink such that the user determines for himself which influencing criterion is intended to lead to which position or which change in the position of the insert plate. A particularly user-friendly embodiment of the sink is made possible thereby. Thus the user may determine for himself which position or which change in the position for the insert plate he desires in which conditions of use of the sink, and which are advantageous for the user.

It may also be provided that such a setting of individual reference positions is possible for at least two different users. Thus the sink may set the desired and assigned reference position of the insert plate with the associated influencing criterion, as a function of the user who respectively uses the sink or would like to use the sink.

It may be provided that the at least one reference position is stored as a user profile in a memory unit of the interaction unit. The aforementioned advantages may be further improved thereby. In particular, it is also possible that a user is recorded and detected by a unit of the sink, in particular the interaction unit, and an optionally stored user profile is recalled as a function thereof.

In an advantageous embodiment it is provided that a top of the insert plate has a surface which is at least 80 percent, in particular at least 90 percent, in particular at least 95 percent, of the surface of the receiving area in a horizontal plane. The surface of the top of the insert plate, however, is less than 99 percent of this surface of the receiving area. By such a dimensioning, the insert plate is configured over virtually the entire surface area relative to the clear width of the receiving area between the lateral walls, and thus fills up this receiving area virtually entirely when viewed in the horizontal plane. On the other hand, however, a small gap, in particular of between 3 mm and 15 mm, in particular of between 3 mm and 10 mm, is permitted over the periphery so that, on the one hand, the relative movement of the insert plate may be carried out unhindered when setting the position or changing the position. In particular, as a result, this avoids direct contact and a side edge of the insert plate potentially scraping along the inner faces of the lateral walls. Thus, on the one hand, damage to the lateral walls is avoided and, on the other hand, damage to the insert plate and also to the lifting device is avoided. Last but not least, it is also advantageously achieved by this embodiment that liquid which is present on the top of the insert plate may be drained in a simple manner into the receiving area through this gap between the edge of the insert plate and the inner faces of the lateral walls.

Preferably, the basin has a drain, in particular on the base wall. As a result, a medium which is arranged in the basin and collects therein may drain out easily via the drain.

In an advantageous embodiment it is provided that the sink has an identification unit by means of which a user may be detected directly and/or a user may be detected as a function of an operating sequence of the sink which is carried out with a plurality of operating processes and which is carried out by the user himself, and/or a user may be detected as a function of a type of operating process of the sink. By means of such an embodiment it may be achieved, on the one hand, that the user himself is detected as a person, for example is detected via a camera. On the other hand, when this is not possible or a camera is not present, the user may be detected indirectly via his operating behavior at the sink. In this context, an operating sequence may be a series of specific operating steps at the sink. A type of operating process may be, for example, the intensity of an operating action and/or the duration of an operating action. For example, this may be the manner of acting on a faucet and/or on an operating device. In this context, for example, at least a single operating step may be evaluated regarding these aforementioned detailed specifications and the user may be detected as a function thereof.

A further aspect of the invention relates to a method for operating a sink. The sink is configured, in particular, according to the aforementioned aspect or an advantageous embodiment thereof. In particular, the sink has a basin which has a base wall and lateral walls adjoining the base wall. In particular, the basin has a receiving area delimited by these walls. The sink has an insert plate which is separate from the basin and which may be inserted into the receiving area or is inserted therein. The insert plate is moved or displaced relative to the basin by a lifting device of the sink. By means of an interaction unit of the sink, an operating state of the sink is detected and/or a change in the operating state of the sink is detected and/or an operating action of the sink by a user is detected. The lifting device is operated so as to automatically position the insert plate and, in particular, the position of the insert plate is correspondingly changed on the basis of the detection by means of the interaction unit.

The advantages achievable thereby have already been described above with reference to the sink.

Advantageous embodiments of the sink are to be regarded as advantageous embodiments of the method. In particular, the components of the sink permit the respective method steps to be carried out individually or at least by being partially operatively connected.

Regarding the individual settings of the insert plate it may be possible that the change in the position of the insert plate is not only carried out by direct handling by the user, such as for example a gesture or a speech command or an actuation of an operating element of the operating device. In this regard, an indirect change in the position may also be carried out by a logic link. For example, the insert plate may be individually moved when a user actuates a faucet of the sink. For example, this may be approaching the faucet or touching the faucet or actually switching on the faucet, so that water also runs out. Depending on this actuation of the functional unit, therefore, a reference position of the insert plate which is linked therewith and which was previously referenced in the learning mode or defining mode may be automatically set.

The identification unit may be a camera. However, it may also be a biometric sensor, for example. This biometric sensor may permit, for example, the identification of biometric features such as a specific ridged pattern of the skin of the finger or an iris recognition of the eye.

It may be provided that the insert plate may be removed from and repositioned onto the lifting device such that it can be released in a non-destructive manner. This is a further advantage since, therefore, the insert plate itself may be removed and, for example, cleaned in an improved manner. Moreover, in this regard the lifting device may also be cleaned in an improved manner. This is also a further advantage for the purposes of maintaining the lifting device. It is thus also possible to reach below the insert plate into the receiving area of the basin. Thus it is potentially also possible to clean this basin in a simpler manner.

In particular, the basin is configured in one piece with the base wall and the lateral walls. In particular, the basin is configured from metal.

The base wall may be flat or slightly inclined or slightly bulged. In particular, it is provided that the point of the base wall at which an outlet for a drain of the sink is configured is offset furthest toward the bottom relative to the vertical position.

It may be provided that the top of the plate is configured to be entirely flat. However, the top may also be slightly bulged. It is also possible that the top of the insert plate is structured at least in some regions. As a result, a certain roughness may be generated. As a result, it is possible to avoid in an improved manner undesired slippage of objects positioned thereon. For example, this is advantageous when a change in the position of the insert plate occurs and objects are still arranged on the top of the insert plate. It is also possible that the top has specific positioning regions. These positioning regions may be recesses. However, such recesses may be configured to be relatively small, for example. This is advantageous in order to be able to position, for example, vessels such as a glass or the like more securely. In particular, this is advantageous when a change in the position is tilting and/or rotating. An undesired slippage of such vessels is thus avoided. Moreover, it is also achieved by such predetermined positioning regions, for example, that when vessels are positioned on the top of the insert plate and, for example, are designed to be filled via the faucet, the water running out of the faucet flows accurately into the vessels with a rotational movement and does not run extensively over the top of the vessels onto the insert plate.

The positions and orientations provided when the sink is used as intended and arranged as intended are specified by the terms "top", "bottom", "front" "rear" "horizontal", "vertical", "depth direction", "width direction", "height direction".

Further features of the invention emerge from the claims, the figures and the description of the figures. The features and combinations of features mentioned above in the description, as well as the features and combinations of features mentioned below in the description of the figures and/or shown individually in the figures are not only able to be used in the respectively specified combination but also in other combinations or individually without departing from the scope of the invention. Thus embodiments of the invention which are not explicitly shown and described in the figures but which emerge from and which may be generated by separate combinations of features from the described embodiments are also to be regarded as encompassed and disclosed. Embodiments and combinations of features which thus do not have all of the features of an originally formulated independent claim are also to be regarded as disclosed.

BRIEF DESCRIPTION OF THE DRAWINGS

Exemplary embodiments of the invention are described hereinafter in more detail with reference to schematic drawings. In the drawings:

FIG. 1 shows a schematic sectional view through an exemplary embodiment of a sink according to the invention with an insert plate in a first position;

FIG. 2 shows the view of the sink according to FIG. 2 with the insert plate in a second position which is different from FIG. 1; and FIG. 3 shows a plan view of an exemplary embodiment of a sink.

DETAILED DESCRIPTION OF EXEMPLARY EMBODIMENTS OF THE PRESENT INVENTION

Elements which are the same or functionally the same are provided with the same reference characters in the figures.

A sink 1 is shown in FIG. 1 in a schematic vertical sectional view (x-y plane with the height direction y and width direction x). The sink 1 has a basin 2. The basin 2 has a base wall 3 and adjoining and upwardly extending lateral walls 4, 5, 6 (FIG. 3) and 7 (FIG. 3). The basin 2 is configured, in particular, in one piece. The basin is preferably configured from metal. The basin 2 has a receiving area 8. The receiving area 8 is delimited by the aforementioned walls 3 to 7. Thus the basin 2 has an upper loading opening 9. The sink 1 also has an insert unit. The insert unit is, in particular, an insert plate 10. The insert plate 10 is configured, in particular, in one piece. The insert plate 10 is a component of the sink 1 which is separate from the basin 2. The sink 1 also has a lifting device 11. The insert plate 10 is arranged on the lifting device 11. In particular, the insert plate is arranged on the lifting device 11 such that it can be released in a non-destructive manner. The insert plate 10 is movable relative to the basin 2 by the lifting device 11. In this context, a movement may take place in the height direction (y-direction) of the sink 1. Additionally or alternatively, a rotation may take place about a vertical axis A of the lifting device 11. Additionally or alternatively, a tilting of the insert plate 10 may take place. This means that the insert plate 10 may be set with its plane at an angle to a horizontal plane. It may thus be positioned in an inclined or oblique manner. In FIG. 1 the insert plate 10 is shown in an exemplary position in the receiving area 8. In particular, this is a position which has been moved downwardly. In this regard, the insert plate 10 is arranged directly adjacent to the base wall 3.

Preferably, the sink 1 has an interaction unit 12. The interaction unit 12 may have a display unit 13 (FIG. 3). The interaction unit 12 may have an operating device 14. The operating device 14 may have one or more operating elements. The operating elements may be push buttons or switches or toggle elements or rotary knobs. The operating device 14, however, may also additionally or alternatively have a touch-sensitive operating panel 15. In an advantageous embodiment it may be provided that the interaction unit 12 has at least one optical recording unit 16. The optical recording unit 16 may be, for example, a camera. The camera may be sensitive in the spectral range visible to humans. The interaction unit 12, however, may also additionally or alternatively have an acoustic unit 17. This acoustic unit 17 may be configured for the reception and/or for the output of speech signals. Moreover, the interaction unit 12 may have an identification unit 18. The identification unit 18 is configured for the detection, or for the identification, of a user of the sink 1. The identification unit 18 may also be formed, for example, by the optical recording unit 16. Additionally or alternatively, however, the identification unit 18 may also have, for example, the acoustic unit 17. As a result, for example, the user may be identified by the evaluation of a speech signal of a user. Additionally or alternatively, the identification unit 18 may be configured as a unit for recording and evaluating a biometric feature of a user. For example, this may be a fingerprint sensor or a sensor for detecting an iris pattern.

As may be identified in FIGS. 1 to 3, the interaction unit 12 may be configured at the side and directly adjacent to the basin 2. For example, a receiving housing 19 which is open at the top may be provided here. The receiving housing 19 may be configured separately from the basin 2. However, the receiving housing may also be formed with the basin 2 such that it can be released in a non-destructive manner. In particular, the receiving housing 19 may also be configured in one piece with the basin 2. The lateral wall directly adjoining the receiving housing 19, in the example here the lateral wall 5, also forms a defining wall for the receiving volume 20 of the receiving housing 19.

Thus the receiving volume 20 is separated from the receiving area 8 of the basin.

Moreover the basin 2 has an outlet opening 27. This is configured, in particular, in the base wall 3. As a result, media may drain out of the receiving area 8.

In FIG. 2 the view according to FIG. 1 is shown, but the insert plate 10 is shown in a different position from FIG. 1. In FIG. 2 the insert plate 10 is oriented horizontally but moved upwardly. In particular, this position represents the maximum possible vertical position in normal mode. In particular, in this position a top 10a of the insert plate 10 is flush with an upper edge 2a of the basin 2. In particular, in this position, the insert plate 10 forms a cover or a lid for the receiving area 8. This upper edge 2a, however, may also be for example a top of a mounting frame or a decorative frame which is a constituent part of the sink 1. The sink 1, in particular the basin 2, may be mounted with the mounting frame in a cutout of a worktop. The basin 2 may be covered from above with a decorative frame. A gap between the basin 2 and a defining wall in the worktop, which defines the cutout, thus may be covered from above. Such a decorative frame, in particular, represents an upper visible component of the arrangement.

In particular, the sink 1 also has a control unit 21 (FIG. 3). The lifting device 11 may be operated by the control unit 21. In particular, the interaction unit 12 may also be operated by the control unit 21.

The sink 1 may preferably also have a faucet 22, as may be identified in the simplified plan view in FIG. 3. The faucet 22 represents a functional unit of the sink 1. The interaction unit 12, in particular the operating device 14, may also be viewed as a functional unit of the sink 1. A further functional unit of the sink 1 may be the insert plate 10. A further functional unit of the sink 1 may be the lifting device 11.

The lifting device 11 preferably has a lifting unit and a motor. As a result, the lifting device may be changed in terms of its length or height in the direction of the vertical axis A. Moreover, the lifting device may be additionally or alternatively rotated about the vertical axis A. As a result, a rotational movement about this vertical axis A is also possible as a position, or as a change in the position, of the insert plate 10. Last but not least, the lifting device 11 may also be set such that the insert plate 10 may be set in an oblique or inclined manner relative to a horizontal plane.

By means of the interaction unit 12, an operating state of the sink 1 can be detected and/or a change in the operating state of the sink 1 can be detected and/or an operating action by a user who operates the sink 1, in particular at least one functional unit of the sink 1, can be detected. The lifting device 11 can be operated so as to automatically change the position of the insert plate 10 on the basis of the detection by means of the interaction unit 12. In FIG. 3 a schematic view of a finger 23 of a user is also shown. The interaction unit 12 is preferably configured for recording a gesture of the user, in particular of the finger 23. In particular, the gesture is a contactless gesture. Additionally or alternatively, however, a direct operation of the operating device 14 may also be carried out with the finger 23. It is provided that an operating state and/or a change in the operating state may be recorded by the camera 16 and/or the acoustic unit 17 and/or the operating device 14. An operating state may be, for example, a setting of the operating device 14 and/or a change in the operating state may be a change in the setting of the operating device 14.

A change in the position of the insert plate 10 may be on the basis of the type and/or intensity and/or duration of an operating state of at least one functional unit of the sink 1 and/or a change in the position may be on the basis of the type and/or intensity and/or duration of a change in the operating state of at least one such functional unit of the sink 1.

The interaction unit 12 has a normal mode. The actual operation of the sink 1 is also recorded in this normal mode. Moreover, the interaction unit 12 has a defining mode which is different from the normal mode. This defining mode may be set, for example, by a user. In this defining mode it is possible that at least one user defines or predetermines at least one reference position of the insert plate 10. In particular, in this defining mode such a reference position may be linked with a specific operating state of at least one functional unit of the sink 1 and/or with a defined change in the operating state of at least one functional unit of the sink 1. At least one such reference position may be stored as a user profile in a memory unit 24 of the interaction unit 12.

In an advantageous embodiment it is provided that the surface shown in FIG. 3 (depth direction z and width direction x) of the top 10*a* is at least 80 percent, in particular at least 90 percent, in particular at least 95 percent, of the surface of the receiving area 8 which is viewed in a horizontal plane (in FIG. 3 the plane of the figures). In particular, however, this surface of the top 10*a* is less than 99 percent of this surface of the receiving area 8 in the aforementioned horizontal plane. As a result, it is achieved that a peripheral edge 25 of the insert plate 10 is spaced apart from the lateral walls 4, 5, 6 and 7. In particular, a peripheral gap 26 between the insert plate 10 and the lateral walls 4 to 7 is formed thereby. The gap 26 may be between 3 mm and 15 mm. Preferably, this gap 26 is sufficiently small, at least in the horizontal position of the insert plate 10, that objects such as cutlery or the like are not able to slip through. Moreover, it is thus possible to avoid the situation where a finger 23 is trapped in this horizontal position of the insert plate 10.

The insert plate 10 may be set automatically relative to its position as a function of at least one influencing criterion. In particular, therefore, the change in the position may be carried out automatically and in a manner which is very defined and appropriate.

In an advantageous embodiment it is provided that in principle a change in the position is not started and/or an already started change in the position is at least interrupted when this change in the position is not able to be carried out or is no longer able to be carried out. For example, this may be the case if objects are deposited on the top 10*a*, which would negatively influence a corresponding change in the position of the insert plate 10. This may be the case, for example, if the lifting device 11 were to be subjected to excessive stress due to the weight of such an object on the top 10*a*. Additionally or alternatively, this may also be the case if, for example, a rotational movement and/or a tilting movement is to be carried out as a change in the position, but the objects present on the top 10*a* could then slip or drop down and this would lead to the damage of these objects. For example, this may be the case if crockery or a drinking vessel such as a glass or the like is placed on the top 10*a*. The aforementioned scenario may also be implemented, starting from the position of the insert plate 10 in FIG. 2, if an object is arranged so as to cover the gap 26. If the insert plate 10 were to be moved downwardly and/or rotated and/or tilted, starting from this upper position, this could also lead to this vessel toppling over in an undesired manner. The scenario set forth above may also be implemented if objects are located in the gap 26 and a change in the position of the insert plate 10 would then lead to the objects being tightly wedged or jammed, and in this regard damage could occur.

All of these potential scenarios may be recorded by one or more sensors of the sink 1.

In an advantageous embodiment it is provided that such objects, which could lead to the aforementioned scenarios, are recorded by the interaction unit 12. For example, this may be carried out by the optical recording unit 16. However, the lifting device 11 may also have a force sensor which, when the lifting device 11 is stressed above a defined force threshold value, at least interrupts the further change in the position or in principle does not start a change in the position.

A dismantling mode which is different from the normal mode of the lifting unit may also be set. In this dismantling mode, the lifting unit of the lifting device 11 is set in an even higher position in the height direction above the maximum lifted position of the lifting unit in normal mode and thus also the corresponding position of the insert plate 10. In the maximum lifted position in normal mode, in particular, it is provided that the top of the insert plate 10 is flush with the top of the upper edge 2*a* of the basin 2 or a decorative frame or a mounting frame. In the dismantling position, which is higher for this purpose, the insert plate 10 is preferably positioned such that it is arranged with its bottom higher than this upper edge 2*a* by a vertical spacing. In particular, this vertical spacing is at least 2 cm, in particular at least 3 cm. As a result, the insert plate 10 may be gripped by a hand on its edge 25 and securely held for removal from the lifting unit. The dismantling position is, in particular, a horizontal position of the insert plate 10. The bottom of the insert plate 10 is thus positioned entirely above the upper edge 2*a*.

The invention claimed is:

1. A sink, comprising:
    a basin including a base wall and lateral walls adjoining the base wall, said basin including a receiving area delimited by the base wall and the lateral walls;
    an insert plate separate from the basin and inserted into the receiving area;
    a lifting device configured to move the insert plate relative to the basin; and
    an interaction unit configured to detect at least one influencing factor selected from the group consisting of an operating state of the sink, a change in the operating state of the sink, and an operating action by a user of the sink, said lifting device being configured for operation such as to automatically change a position of the insert plate in response to a detection of the at least one influencing factor by the interaction unit,
    wherein the change in the position of the insert plate is either a tilting movement about a horizontal axis or a rotational movement about a vertical axis.

2. The sink of claim 1, wherein the interaction unit includes a camera and/or an operating device.

3. The sink of claim 2, wherein the camera is configured to record an operating state and/or a change in the operating state by the camera.

4. The sink of claim 2, wherein an operating state is a setting of the operating device and/or a change in the operating state is a change in the setting of the operating device.

5. The sink of claim 1, further comprising a functional unit, wherein a change in the position is in response to a type and/or intensity and/or duration of an operating state of the functional unit and/or a change in the position is in response to a type and/or intensity and/or duration of a change in the operating state of the functional unit.

6. The sink of claim 5, wherein the functional unit is at least one member selected from the group consisting of a faucet, an operating device of the interaction unit, the insert plate, and the lifting device.

7. The sink of claim 1, wherein the change in the position of the insert plate is a linear lifting movement.

8. The sink of claim 1, wherein the operating action is a contactless gesture of the user or a speech command or a process of touching an operating surface of an operating device of the interaction device, or an operating process of a faucet of the sink.

9. The sink of claim 1, wherein the interaction unit has a defining mode which is different from a normal mode and in which the user is able to predetermine in a defined manner a reference position of the insert plate.

10. The sink of claim 9, wherein the interaction unit is configured to enable the user to link the reference position of the insert plate with a specific operating state of the sink and/or a defined change in the operating state of the sink.

11. The sink of claim 9, wherein the interaction unit includes a memory to store the reference position as a user profile.

12. The sink of claim 1, wherein the insert plate includes a top having a surface which is at least 80% of a surface of the receiving area in a horizontal plane but less than 99% of the surface of the receiving area.

13. The sink of claim 1, wherein the insert plate includes a top having a surface which is at least 90% of a surface of the receiving area in a horizontal plane but less than 99% of the surface of the receiving area.

14. The sink of claim 1, wherein the insert plate includes a top having a surface which is at least 95% of a surface of the receiving area in a horizontal plane but less than 99% of the surface of the receiving area.

15. The sink of claim 1, further comprising an identification unit configured to identify the user in at least one of three ways, a first way in which the user is identified directly, a second way in which the user is identified as a function of an operating sequence of the sink with a plurality of operating processes, a third way in which the user is identified as a function of a type of an operating process of the sink.

16. A method for operating a sink which comprises a base wall, lateral walls adjoining the base wall and delimiting with the base wall a receiving area, and an insert plate separate from the basin and inserted into the receiving area, said method comprising:
- detecting with an interaction unit of the sink at least one influencing factor selected from the group consisting of an operating state of the sink, a change in the operating state of the sink, and an operating action by a user of the sink; and
- operating a lifting device of the sink to move and automatically change a position of the insert plate relative to the basin in response to the influencing factor detected by the interaction unit,
- wherein the change in the position of the insert plate is either a tilting movement about a horizontal axis or a rotational movement about a vertical axis.

* * * * *